(12) United States Patent
Toillon et al.

(10) Patent No.: US 9,660,920 B2
(45) Date of Patent: *May 23, 2017

(54) SWITCHED DATA TRANSMISSION SYSTEM THAT MAY BE USED IN PARTICULAR IN AVIONICS APPLICATIONS

(71) Applicant: Thales, Neuilly sur Seine (FR)

(72) Inventors: Patrice George Paul Toillon, Meudon la Foret (FR); David Jose Faura, Meudon la Foret (FR); Thomas Criqui, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 58 days.

This patent is subject to a terminal disclaimer.

(21) Appl. No.: 14/317,457

(22) Filed: Jun. 27, 2014

(65) Prior Publication Data

US 2015/0016259 A1 Jan. 15, 2015

(30) Foreign Application Priority Data

Jun. 28, 2013 (FR) ...................................... 13 01539

(51) Int. Cl.
*H04L 12/841* (2013.01)
*H04L 12/851* (2013.01)
*H04L 12/853* (2013.01)
*H04L 12/437* (2006.01)
*H04L 12/933* (2013.01)

(52) U.S. Cl.
CPC ........ *H04L 47/2416* (2013.01); *H04L 12/437* (2013.01); *H04L 47/24* (2013.01); *H04L 47/28* (2013.01); *H04L 49/15* (2013.01)

(58) Field of Classification Search
CPC ....... H04L 47/28; H04L 47/286; H04J 3/0644
See application file for complete search history.

(56) References Cited

U.S. PATENT DOCUMENTS

| | | | |
|---|---|---|---|
| 6,760,309 B1 | 7/2004 | Rochberger et al. | |
| 2003/0167348 A1 | 9/2003 | Greenblat | |
| 2008/0008181 A1* | 1/2008 | Yamada | H04L 45/02 370/392 |
| 2008/0144668 A1* | 6/2008 | Hall | H04J 3/0652 370/503 |
| 2010/0333099 A1* | 12/2010 | Kupferschmidt | G06F 9/546 718/103 |

(Continued)

OTHER PUBLICATIONS

French Search Report dated Mar. 14, 2014, from corresponding French Application No. 1301539.

*Primary Examiner* — Scott M Sciacca
(74) *Attorney, Agent, or Firm* — Troutman Sanders LLP

(57) ABSTRACT

This switched data transmission system, particularly for use in avionics applications, of the type comprising a plurality of electronic devices and equipment units adapted for transmitting discrete messages over a transmission network, and in which each of the devices and equipment units is connected to a network switch, the switches being connected to each other by means of data transmission links so as to form a physical topology of a loop network, each message being associated with information regarding data flow priority in the network comprising of functional priority information, is characterized in that each message is also associated with information regarding temporal priority of data flow in the network.

8 Claims, 2 Drawing Sheets

(56) References Cited

U.S. PATENT DOCUMENTS

2012/0195322 A1* 8/2012 Ramanujam ........ H04L 12/4637
370/413
2012/0290692 A1 11/2012 Reich et al.

* cited by examiner

SWITCHED DATA TRANSMISSION SYSTEM THAT MAY BE USED IN PARTICULAR IN AVIONICS APPLICATIONS

CROSS-REFERENCE TO RELATED APPLICATIONS

The present application claims priority to French Patent Application No. FR 13 01539 filed Jun. 28, 2013, which is herein incorporated by reference in its entirety.

Field of the Invention

The present invention relates to a switched data transmission system, particularly for use in avionics applications.

BACKGROUND

There already exist in the state of the art a certain number of systems of this type which include a plurality of electronic devices and equipment adapted for transmitting discrete messages over a data transmission network generally by means of frames.

Each of the devices is then connected to a network switch or frame switch, the switches being connected to each other by means of data transmission links so as to form a physical topology of a loop data transmission network.

Systems of this kind may for example correspond to various types of standards such as ARINC 664 Ethernet IEEE 802.3 or still others.

These switch based systems also referred to by the English term "switched" (French: "commutés"), are well known in the state of the art and thus provide the ability to ensure the transmission of messages between different devices which is effected by using defined frame formats.

In the state of the art, the management of the message traffic flow over the network is performed at the level of frames.

Such management is carried out in part, based on the transmission related information such as in particular, information as to priority of the elementary logic stream to which the message in question belong, and hence to which the frames associated therewith for their transmission over the network belong.

In the state of the art, such priority information pertains to so called functional priority information, that is to say, for example, related to the nature and importance of the function performed by the corresponding device or equipment and by the relevant message considered.

It is then understood that these systems involve implementation of analytical means for analysing these priority related information and data in order to manage the flow of messages across the network according to the respective levels of priority thereof and for each of the elementary logic streams to which they belong.

However this type of loop physical topology presents a certain number of drawbacks induced by certain uses of this topology in the loop topology networks.

Indeed there appear to be constraints and limitations in the case where the elementary logic streams supported, share common physical parts of the propagation path.

Thus for example, if these elementary logic streams share the same output ports of switches, this would result in the fact that one could face the situation, for instance, of being unable to compute an upper bound on the transmission time (maximum end to end latency) for all of the elementary logic streams having the same so called functional priority.

This leads to the calculation of end to end maximum latency becoming non convergent thereby resulting in the inability to prove the determinism of the network thus making it impossible to use due to it being no longer possible to appropriately satisfy, for example, the criteria for analysis and validation of such systems, in particular in avionics applications.

The objective of the invention is thus to provide a solution for the communication architecture with principles and mechanisms that enable the cancellation of each of the time dependent loops thus facilitating the use of the network because it no longer imposes constraints for routing elementary logic streams (exclusion of routing) and rendering possible the calculation of maximum latency of each of the elementary logic streams, that is to say that, the deterministic nature is demonstrable.

SUMMARY

To this end, the object of the invention relates to a switched data transmission system, that may be used in particular in avionics applications, of the type comprising a plurality of electronic devices and equipment units adapted for transmitting discrete messages over a transmission network, and in which each of the devices and equipment units is connected to a network switch, the switches being connected to each other by means of data transmission links so as to form a physical topology of a loop network, each message being associated with information regarding data flow priority in the network comprising of functional priority information, characterised in that each message is also associated with information regarding temporal priority of data flow in the network.

According to other characteristic features of the system according to the invention, taken into consideration individually or in combination:
- the temporal (time) priority is defined by the age of the message;
- the functional priority levels take precedence over temporal priority levels;
- the priority information is integrated at least in part in the messages;
- the switches include managing means for managing the flow of messages based on their age;
- the switches are adapted to ensure that the newest messages are prioritised to take precedence over others;
- the switches of the network share a common temporal (time) reference framework;
- the electronic equipment units on the network share a common temporal (time) reference framework;
- the temporal priority is defined by the time (instant) of input of the message into the network;
- the temporal priority is defined by the time of creation of the message by the equipment unit.

BRIEF DESCRIPTION OF THE DRAWINGS

The invention will be better understood with the aid of the description which follows, provided solely by way of example and with reference made to the accompanying drawings, in which.

DETAILED DESCRIPTION

Figure 1:
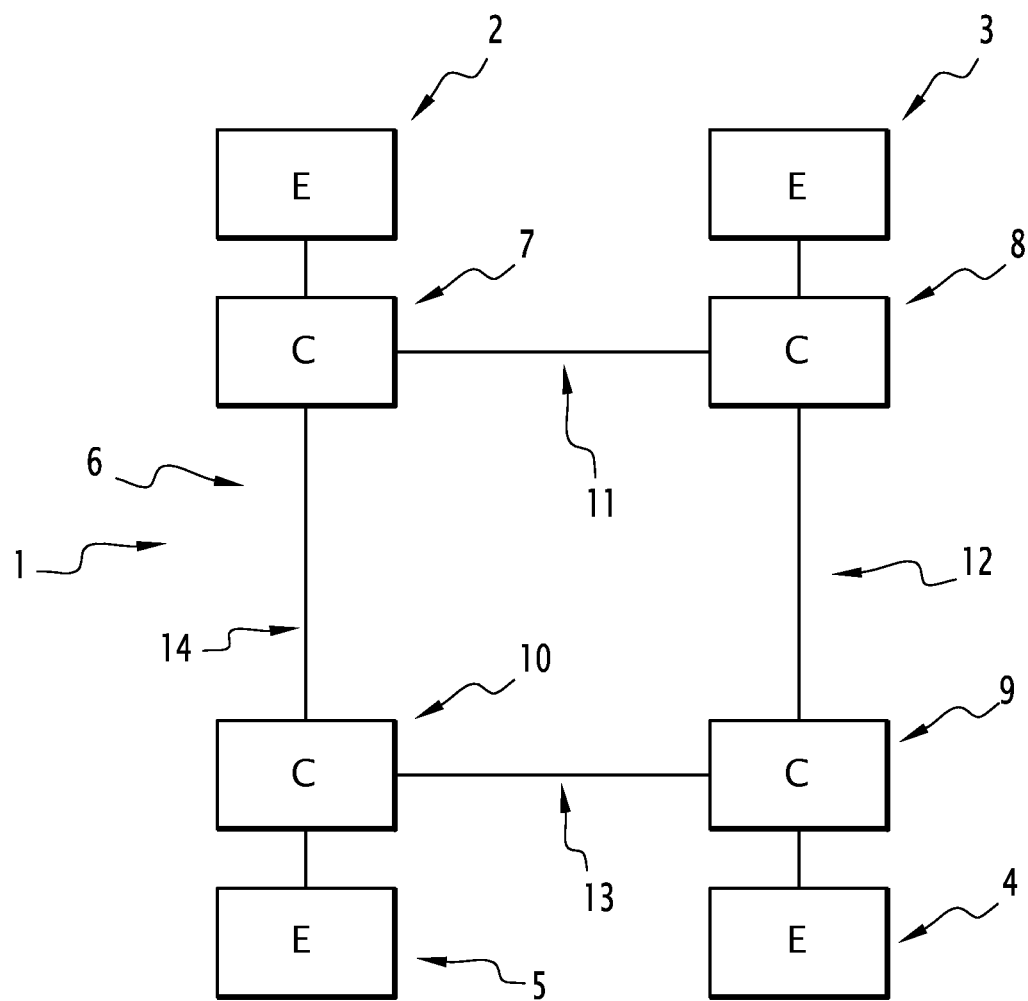
FIG. 1 is a block diagram illustrating the general structure of a switched data transmission system with loop physical topology according to the invention, and FIG. 2 schematically illustrates the information relating to message flow priority in a network, as implemented in a system according to the invention.

In effect presented in a general manner in FIG. 1, is an illustration of a data transmission system.

This system is designated by the general reference numeral 1 in this figure and consists of a switched data transmission system that may be used in particular in avionics applications.

Thus, such a system may include a plurality of electronic devices and equipment units, of which four are illustrated in this figure and are designated by the general reference numerals 2, 3, 4 and 5.

In a conventional manner these electronic devices and equipment units are designed to send discrete messages over a data transmission and communications network designated by the general reference numeral 6 in this FIG. 1.

Each of these devices and equipment units is then connected, also in conventional manner, as illustrated, to a network switch.

Thus, for example, the devices/equipment units 2, 3, 4 and 5 are connected respectively to the network switches 7, 8, 9 and 10.

These switches are generally known by their generic English appellation of "switches" and together form a so called switched system of data transmission or communication.

In this type of network, the transmission of data and information is carried out on a conditional basis, that is to say, in which at least part of the routing of the message depends on the message itself, as is already well known.

As illustrated, the switches are connected to each other by data transmission links in a manner so as to form a physical topology of a loop network also known as "looped" network.

Thus, for example the link means for data transmission linking respectively designated by the reference numerals 11, 12, 13 and 14 are used to connect the switches 7, 8, 9 and 10 between themselves respectively.

Also in a conventional manner, each discrete message sent over this network is associated with information regarding data flow priority in the network.

This priority related information can then be used to define and manage by way of scheduling the pass through of messages over this network and in particular, over the data transmission links between the switches or even within the latter, that is to say on each of the output ports of each switch.

In a conventional manner, this information regarding data flow priority in the network includes information relating to functional priority. The functional priority related data and information are then defined for the message considered and, in particular, by the function or functions performed by the electronic equipment thereof.

Indeed it may be easily understood that the functions may be qualified as taking priority over others and thereby lead to the establishment of a hierarchy amongst them.

Such functional priority information may then be used to establish a table or even a ranking of priorities for transmission of messages in relation to each other across the network.

As has been indicated previously, systems of this type present a certain number of drawbacks.

In order to resolve these, in the transmission system according to the invention, all the messages sent over the network or at least some amongst them, are also associated with information regarding temporal priority of data flow in the network.

Such temporal priority related information then no longer depends on messages of functions supported by the electronic devices and equipment units deploying these but rather, they are establish based on the time and in particular by the age of the latter, for example.

Thus, for example, a message transmitted by a given equipment unit through its associated network switch, may be associated with a temporal reference such as, for example, its time (instant) of transmission over the network.

In a conventional manner, this time instant of transmission may be integrated in the message as, for example, a part of the information in the header thereof.

The message is then made to pass through the network and the switches are equipped with the means that ensure the ability to manage the flow and distribution of these messages based on their age, that is to say, for example, based on the difference between the time of transmission recorded in the header of the message and the current time.

Quite obviously the functional priority levels take precedence over the temporal priority levels.

In addition the switching means are adapted to ensure, for example, that the newest messages are prioritised to take precedence over other messages on the network, the temporal priority of each message thus being decremented upon each successive pass through of this message in a switch. In fact, the messages sent by the equipment unit associated with the switch being passed through will be of a higher temporal priority on account of being newer.

In effect, they would have been generated more recently than the others.

Thus it may be conceived that in order to have a common reference framework that allows for managing this temporal priority, the network switches may share a common temporal reference framework, as well as the electronic equipment units thereof.

Finally it is to be noted that the temporal priority may be defined by the time (instant) of input of the message into the network or even by the time of creation of the message by the equipment unit.

Figure 2:
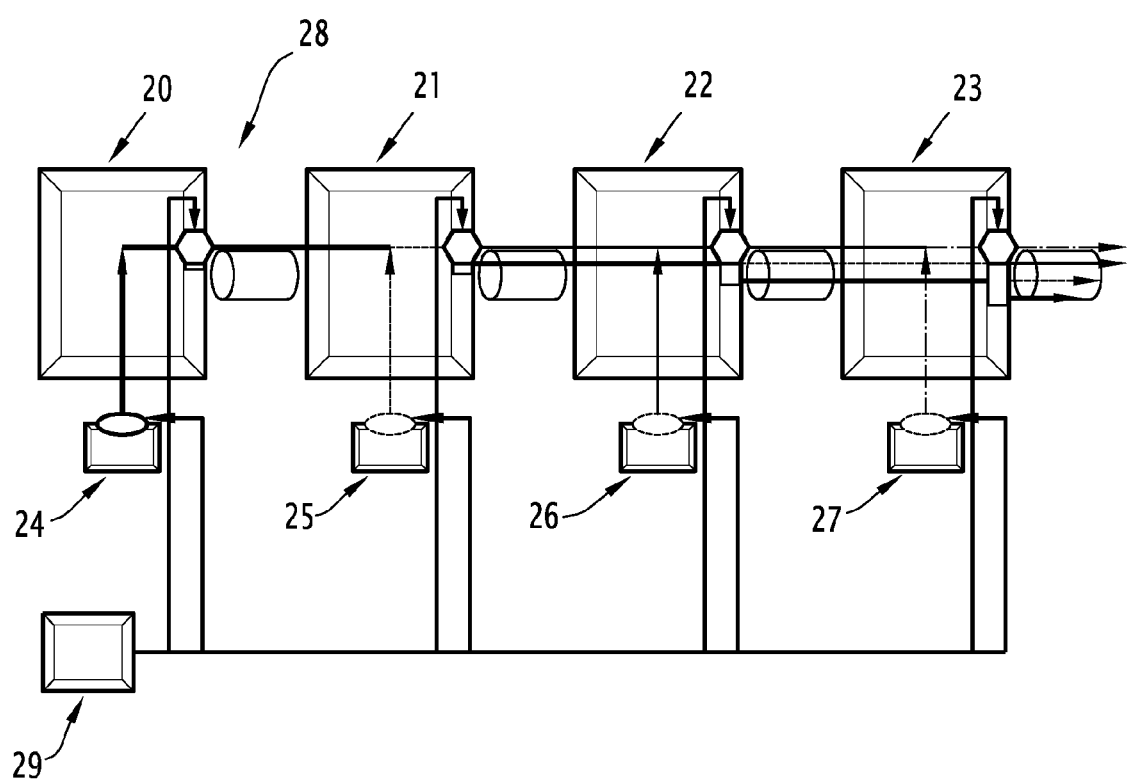

Such a mode of functioning is illustrated in schematic fashion in FIG. 2.

In effect it is easy to recognise in this FIG. 2, four switches 20, 21, 22 and 23 respectively, associated with four equipment units 24, 25, 26 and 27 respectively.

These switches are connected in series by means of a network designated by the general reference numeral 28.

These various different switches and/or equipment units are associated with a common time reference designated by the general reference numeral 29.

It may thus be seen in the light of this figure, that a message transmitted by the equipment unit 24 through the switch 20 will come to be allocated, within a given functional priority relative to the function, a temporal priority corresponding, for example, to its time of transmission on the network.

During its passage through the switch 21, the message loses one level of temporal priority relative to the message sent by the equipment unit 25 associated with the switch 21 and so on, the temporal priorities being decremented upon each successive pass through of the messages in the switches.

The difference between the respective actual time of each successive pass through of the message in the switches 21, 22, 23 and the time of transmission of the message over the network only keeps increasing.

It is thus that one understands that the priority is determined based on the age of the message, the messages that are the newest being for example assigned the highest priority level according to this temporal priority.

Thus for each of the elementary logic streams one priority level is added to the level of temporal priority in complement to the level of functional priority.

This addition of a specific priority level therefore makes it possible to open the time dependent loops and to thus cancel them to the extent that each temporal priority is decremented upon the successive pass through of each switching connection unit such as for example a switch, and this is based on a priority level set at the transmission of each logic stream.

Thus, for each of the elementary logic streams, there may be an assignment of a priority level during the transmission that corresponds for example to the actual time instant of transmission thereof on the network.

A global time system serving as a common temporal reference framework may then be run and managed transversely for all of the equipment units of the network, that is to say, the transmitters or even the switches. Thus, each device/equipment unit on the network has and follows this common global time system.

During transmission of the information the actual time derived from the last received time is inserted by the transmitting equipment unit into the information transmitted at the frame level. This information transmitted is associated with an elementary logic stream.

During propagation, the temporal priority is decremented on each pass through in an output port of a switch and this occurs right through to the last switch to be passed through.

This decrement to the lower priority level is then associated with the difference between the actual time of passage of the information in the output port of the switch and the time of transmission contained in the information at the frame level.

It may thus be appreciated that the farther along the information progresses through the network, that is to say, the more the information passes from one switch to another, the greater will be the increase in the difference with the time of transmission and therefore the greater will be the decrease in the temporal priority of the information.

Situations of interdependencies are broken to the extent where the application of the temporal basis ensures the ability to manage in an independent fashion the elementary logic streams originating from equipment units connected to these successive switches.

Hence, information and data with the same temporal priority indeed originate only from equipment units connected to the same switch.

The temporal priority does not change the functional priority insofar as it always corresponds to an intermediate level that is applicable within the functional priority of each logic stream.

Two logic streams or two information/data items having different levels of functional priority will come to be transmitted according to the same principles, that is to say that the stream having the higher functional priority level shall always remain higher in priority than the one having a lower functional priority.

For two identical levels of functional priority the elementary logic stream or information/data item having the higher level of functional priority has the highest priority at the level of the same output port of this switch.

Each switch then manages, elementary logic stream by elementary logic stream or information/data item by information/data item, the temporal priority in addition to the functional priority without breaking the functional priority, with this occurring at each of these output ports, based on the actual time deriving from the global network time and the time of transmission associated with the information/data item.

Implementation of the elementary logic streams or information/data items remains predefined, unique and static.

The topology is fixed, that is to say that the respective position of the equipment units and switches is completely known at the time of the physical and logical construction of the network.

The decrement is carried out in the direction of propagation of each elementary logic stream or information/data item while passing through each switch.

The difference between the respective actual time and the time of transmission of the information/data item only keeps increasing, and the temporal priority of the information/data item only keeps decreasing upon each successive passage through the switch.

The elementary logic streams or information/data items originating from an equipment unit located downstream relative to those transmitted by equipment units located upstream with respect to the direction of propagation will therefore be of a higher priority level with this being for the same level of functional priority, and will not come into conflict with time dependent loops.

It may then be appreciated that such a structure presents a number of advantages.

Indeed, such a system provides the ability to deploy loop physical topologies, used by transmission subscribers that are autonomous with respect to each other, autonomous with respect to the network, and without constraints, that is to say, by intrinsic resolution of time dependent loop situations.

In particular, this structure makes it possible to calculate maximum latency values for any elementary logic stream whatsoever, which was not the case in the state of the art.

Quite obviously, still other embodiments may also be envisaged.

The invention claimed is:

1. A switched data transmission system for use in avionics applications, comprising:
   a plurality of switches; and
   a plurality of transmitters transmitting discrete messages over a transmission network, each of the transmitters is connected to a switch,
   wherein the switches are connected to each other by data transmission links forming a physical topology of a loop network,
   wherein each message is associated with information regarding data flow priority in the network comprising of functional priority information,
   wherein each message is also associated with information regarding temporal priority of data flow in the network,
   wherein the switches of the network share a common temporal reference framework,
   wherein the common reference framework allows the managing of the temporal priority,
   wherein the transmission of each message having a functional priority level superior to the functional priority level of a second message takes precedence over the transmission of the second message regardless of the time priority levels associated with the two messages,
   wherein the switches are adapted to ensure that the newest messages are prioritized to take precedence over others, and
   wherein each of the switches is configured to decrement the temporal priority of each message in an output port of the switch during transmission of the message.

2. The switched data transmission system according to claim 1, wherein the temporal priority is defined by the age of the message.

3. The switched data transmission system according to claim 2, wherein the functional priority levels take precedence over temporal priority levels.

4. The switched data transmission system according to claim 1, wherein the priority information is integrated at least in part in the messages.

5. The switched data transmission system according to claim 1, wherein the switches are able to manage the flow of messages based on their age.

6. The switched data transmission system according to claim 1, wherein the transmitters on the network share a common temporal reference framework.

7. The switched data transmission system according to claim 1, wherein the temporal priority is defined by the time of input of the message into the network.

8. The switched data transmission system according to claim 1, wherein the temporal priority is defined by the time of creation of the message by the transmitters.

* * * * *